United States Patent
Gardiner et al.

(10) Patent No.: US 11,196,332 B1
(45) Date of Patent: Dec. 7, 2021

(54) RECHARGING ELECTRIC GENERATOR SYSTEM

(71) Applicants: Cottrell Salisbury Gardiner, New Providence (BS); Samantha Rene Gardiner, New Providence (BS)

(72) Inventors: Cottrell Salisbury Gardiner, New Providence (BS); Samantha Rene Gardiner, New Providence (BS)

( * ) Notice: Subject to any disclaimer, the term of this patent is extended or adjusted under 35 U.S.C. 154(b) by 0 days.

(21) Appl. No.: 17/248,967

(22) Filed: Feb. 16, 2021

(51) Int. Cl.
| | |
|---|---|
| *H02K 25/00* | (2006.01) |
| *H02K 27/00* | (2006.01) |
| *H02K 53/00* | (2006.01) |
| *H02J 7/00* | (2006.01) |
| *H02M 7/04* | (2006.01) |
| *H02J 9/06* | (2006.01) |

(52) U.S. Cl.
CPC ............ *H02K 53/00* (2013.01); *H02J 7/0042* (2013.01); *H02J 9/061* (2013.01); *H02J 9/068* (2020.01); *H02M 7/043* (2013.01)

(58) Field of Classification Search
CPC ..... Y02T 10/70; Y02T 10/7072; Y02T 10/62; H02K 1/2766; H02K 1/276
See application file for complete search history.

(56) References Cited

U.S. PATENT DOCUMENTS

| | | | | |
|---|---|---|---|---|
| 2010/0097031 | A1* | 4/2010 | King | B60L 53/22 |
| | | | | 320/109 |
| 2013/0234653 | A1* | 9/2013 | Botts | H02J 7/0042 |
| | | | | 320/107 |
| 2017/0063192 | A1* | 3/2017 | Kuznetsov | H02P 25/22 |
| 2017/0163053 | A1* | 6/2017 | Botts | H02J 7/007 |
| 2018/0167002 | A1* | 6/2018 | Frampton | B60L 58/10 |
| 2018/0226805 | A1* | 8/2018 | Cao | H02P 9/48 |
| 2018/0278168 | A1* | 9/2018 | Brown | H02J 7/0068 |
| 2019/0115758 | A1* | 4/2019 | Orban | H02K 7/18 |
| 2020/0148064 | A1* | 5/2020 | Gonzales | B60L 50/60 |

* cited by examiner

*Primary Examiner* — Rexford N Barnie
*Assistant Examiner* — Elim Ortiz

(57) ABSTRACT

A recharging electric generator system which generates electrical energy and recharges itself, and methods thereof. A recharging electric generator system comprises at least one inverting apparatus; at least one power source/storage device to start the system and store electrical energy; at least one switching device; at least one transformer unit to adjust the voltage of the electrical energy, at least one rectifying unit to convert a portion of the electrical energy from alternating current to direct current and to transfer electrical energy to recharge the at least one power source/storage device; and at least one power outlet/output terminal to distribute electrical energy for further use. A recharging electric generator system seeks to provide of renewable source of energy which could be applied to different sectors and is conducive to conditions in both developed and developing countries.

8 Claims, 9 Drawing Sheets

RECHARGING ELECTRIC GENERATOR SYSTEM

BACKGROUND OF THE INVENTION

1. Field

This specification relates to a system which generates electrical energy and recharges itself, and methods thereof.

2. Description of the Related Art

Given the increased awareness of the negative effects that fossil fuel emissions can have on the environment and on respiratory health, considerable efforts have been made to reduce emissions, by for example, enhancing the efficiency of combustion engine vehicles, or by increasing the use of electric or hybrid vehicles. Beyond of the automobile industry, efforts have also been made to use cleaner, more ecologically friendly sources of energy, such as solar, wind, hydrology, clean coal, etc.

While these efforts have been noteworthy, there are still are some limitations, inefficiencies, and areas for improvement. The use of electric and hybrid vehicles to some extent only diverts the problem of air pollution rather than resolving it. This is because the increased use of electric and hybrid vehicles, simply implies a switch from fossil fuels to electricity, without recognizing that only a limited portion of electricity is generated from renewable energy sources.

In addition, some of the main reasons why electric cars have been disadvantaged in the past compared to internal combustion engine vehicles, include issues such as: limited autonomy, limited scope of application, and higher initial costs. Efforts made in this area, e.g. to increase the autonomy of electric cars, do not however, sufficiently resolve these constraints in a cost-effective manner. For example, the application of "eco-friendly" technologies comes at a higher cost, and as a result, the purchase price of electric cars tends to be more expensive than their fuel-based equivalents. Hybrid vehicles are not sufficiently effective in addressing the issue of emissions, as fossil fuels continue to be used, although to a lesser extent. The use of electric and battery driven vehicles are limited in their scope of application. In general, electric vehicles require batteries to be recharged by connecting them to electricity sources at residences or at charging stations. Such solutions are more conducive for urban areas in developed countries where vehicle owners have personal access to a reliable supply of electricity. However, in metropolitan areas, where the air pollution is more problematic, the lack of sufficient charging stations is a considerable limiting factor, constrained for example, by the limited number of personal garages with electrical outlets, penury of parking spaces in general, limited number of charging stations, and the costs of installing new ones. Inductive charging and wireless power transfer systems are also confined in their scope of application, as they are not conducive to conditions found in many developing countries which have less developed infrastructure such as paved roads, and which have limited or inconsistent supply of electricity.

Consequently, there is a need for a system which generates electricity and is capable of recharging itself to overcome the constraints mentioned above.

SUMMARY

The subject matter described in this specification seeks to overcome the constraints mentioned above. One aspect of the subject matter described in this specification is embodied in a recharging electric generator system.

A recharging electric generator system comprises at least one inverting apparatus configured to make and break electrical current. The recharging electric generator system comprises at least one power source/storage device connected to the at least one inverting apparatus. The at least one power source/storage device is configured to provide electrical energy to start the at least one inverting apparatus and to store electrical energy. The recharging electric generator system comprises at least one transformer unit connected to the at least one inverting apparatus, wherein each said transformer unit is configured to step up the voltage of the electrical current received from the at least one inverting apparatus. Said at least one transformer unit could also be configured to step down the voltage of the electrical current received from the at least one inverting apparatus, if needed, by reducing the number of loops in the secondary coils. The recharging electric generator system comprises at least one rectifying unit connected to the at least one transformer unit. Said at least one rectifying unit converts alternating current (AC) to direct current (DC). The at least one rectifying unit is also connected to the at least one power source/storage device. Said rectifying unit is configured to transfer electrical energy to charge the at least one power source/storage device, thereby providing a sustainable source of energy for the system. The recharging electric generator system comprises a switching device connected to the at least one power source/storage device, to the at least one inverting apparatus, to the at least one transformer unit and to the at least one rectifying unit. The switching device is configured: to start and stop the recharging electric generator system; to control the electrical connections between: the at least one power source/storage device, the at least one inverting apparatus, the at least one transformer unit and the at least one rectifying unit; and to transfer electrical current to ground. The recharging electric generator system also comprises at least one power outlet/output terminal connected to at least one transformer unit. Said at least one power outlet/output terminal may be configured to distribute electrical energy to sources external to the system, e.g. vehicles, appliances, power grids, power storage and other devices. The at least one power outlet/output terminal may further be configured to distribute electrical energy to external sources by wireless means.

These and other embodiments of the recharging electric generator system may further include one or more of the following features. The switching device can further include a sensor/control unit, said switching device with a sensor/control unit connected to the at least one power source/storage device, to the at least one inverting apparatus, to the at least one transformer unit, and to the at least one rectifying unit, hereafter referred to jointly as the system apparatus. Said switching device may be configured to monitor the amount of electrical energy stored in the at least one power source/storage device and to regulate the amount of electrical energy transferred from the at least one transformer unit via the at least one rectifying unit to the at least one power source/storage device, to avoid overcharging the at least one power source/storage device. The at least one switching device with a sensor/control unit can be configured to detect the electrical energy level in the at least one power source/storage device, wherein if the energy level is at or below a lower threshold (e.g. =<10%), the switching device: directs electrical energy from the at least one transformer unit via the at least one rectifying unit to recharge the at least one power source/storage device; and disallows the flow of energy from the at least one power source/storage device to the at least one inverting apparatus. If the energy level of the at least one power source/storage device is at or above an upper threshold (e.g. =>90%), the switching device: allows the flow of energy from the at least one power source/storage device to the at least one inverting apparatus; disallows the flow of energy from the at least one transformer unit via the at least one rectifying unit to the at least one power source/storage device; and redirects electrical energy from the at least one transformer unit to the at least one power outlet/output terminal. If the energy level of the at least one power source/storage device is between the lower and upper thresholds (e.g. between 10%-90%), the switching allows the flow of energy to the various system apparatus. The at least one switching device with a sensor/control unit may be configured to allow users to regulate the thresholds based on their needs. Said switching device with a sensor/control unit can further be configured to monitor the operational status of the system apparatus: wherein if the operational status of a system apparatus is functional, said switching device with a sensor/control unit allows the flow of electrical energy to the system apparatus and conducts additional tests. If the operational status is not functional, said switching device with a sensor/control unit disallows the flow of electrical energy to the system apparatus with a non-functional operational status. Said switching device with a sensor/control unit could also be configured to send an error message when the operational status of a system apparatus is detected as non-functional.

These and other embodiments of the recharging electric generator system may optionally include one or more of the following features. In one configuration, at least one inverting apparatus is connected to at least one transformer unit (primary transformer unit). Said at least one primary transformer unit is configured to adjust the voltage of the electrical current received from the at least one inverting apparatus. Said at least one primary transformer unit, is connected to at least one rectifying unit, said at least one rectifying unit converts AC to DC. Said at least one rectifying unit is connected to at least one power source/storage device. Said at least one rectifying unit is configured to transfer electrical energy to recharge the said at least one power source/storage device. Said at least one primary transformer unit is also connected to one or more additional transformer units or to a series of one or more individual additional transformer units, so that a portion of the electrical energy could be transferred from the at least one primary transformer unit to the one or more additional transformer units without passing via the at least one rectifying unit. Said one or more additional transformer units are configured to adjust the voltage of the electrical current received from the primary transformer unit or from a previous transformer unit in a series. The one or more additional transformer units are connected to at least one power outlet/output terminal, said at least one power outlet/output terminal can be configured to distribute electrical energy to sources external to the system.

In another configuration, at least one inverting apparatus is connected to a plurality of transformer units (at least one primary transformer unit, and one or more additional transformer units), said plurality of transformer units are configured to adjust the voltage of the electrical current received from the at least one inverting apparatus. At least one transformer unit (primary transformer unit), is connected to at least one rectifying unit, said rectifying unit converts AC to DC. Said at least one rectifying unit is connected to at least one power source/storage device. Said at least one rectifying unit is configured to transfer electrical energy to recharge the said at least one power source/storage device. The at least one primary transformer unit is also connected to one or more additional transformer units or to a series of one or more individual additional transformer units so that a portion of the electrical energy could be transferred from the at least one primary transformer unit to the one or more additional transformer units without passing via the at least one rectifying unit. Said one or more additional transformer units are configured to adjust the voltage of the electrical current received from the primary transformer unit or from a previous transformer unit in a series and from the at least one inverting apparatus. The one or more additional transformer units are connected to at least one power outlet/output terminal, said at least one power outlet/output terminal can be configured to distribute electrical energy to sources external to the system.

In another configuration, at least one inverting apparatus is connected to a plurality of transformer units (at least one primary transformer unit, and one or more additional transformer units). Said plurality of transformer units are configured to adjust the voltage of the electrical current received from the at least one inverting apparatus. At least one transformer unit (primary transformer unit), is connected to at least one rectifying unit, said rectifying unit converts AC to DC. Said at least one rectifying is unit connected to at least one power source/storage device. Said at least one rectifying unit is configured to transfer electrical energy to recharge the said at least one power source/storage device. The at least one primary transformer unit is also connected to at least one power outlet/output terminal so that a portion of the electrical energy could be transferred from the primary transformer unit to the at least one power outlet/output terminal without passing via the at least one rectifying unit. The one or more additional transformer units are connected to at least one power outlet/output terminal. Said at least one power outlet/output terminal can be configured to distribute electrical energy to sources external to the system.

In another aspect, the subject matter is embodied in an inverting apparatus. Said inverting apparatus comprises at least one motor, and at least one connector, said at least one connector connected to the at least one motor and configured to rotate as the motor turns. An inverting apparatus further comprises at least two non-conductive surfaces, attached to the at least one motor, so that the at least one motor is between the non-conductive surfaces. At least one of the said non-conductive surfaces is perforated so that said at least one connector connected to the motor, passes through the perforation of the said non-conductive surface. An inverting apparatus further comprises at least one shaft, connected to the at least one connector. Said at least one connector is connected to the motor at the one end, passes through the perforation of the at least one non-conductive surface and is connected to the shaft at the other end. Said at least one connector configured to rotate the shaft as the motor turns. Said at least one shaft comprises two connected segments made of conductive material. The inverting apparatus comprises at least three brushes made of conductive material (e.g. metal); said brushes affixed to the perforated non-conductive surface and positioned so that they are in contact with the shaft. Said at least three brushes positioned so that a majority of the brushes is in contact with only one segment of the shaft at a time. The at least three brushes make and break electrical current as the shaft rotates. The inverting apparatus comprises connecting devices made of conductive material, connected to the at least three brushes, said connecting devices configured to transfer electrical energy from the at least three brushes to other sources. The motor of the inverting apparatus may be connected to at least one power source/storage device, said power source/storage device configured to provide power to start the motor and to store energy. The connecting devices of the inverting apparatus may be connected to at least one transformer unit, said transformer unit configured to adjust the voltage of the electrical current received from the inverting apparatus, up or down depending on the configuration.

In yet another aspect, the at least one inverting apparatus can further comprise at least one magnet/compartment of magnets, connected to the shaft, where at least one of the said magnets is a permanent magnet and wherein the at least one magnet/compartment of magnets is configured to rotate independently of the shaft. The inverting apparatus may further include a plurality of captor devices made of conductive material (e.g. copper coils), connected to the outer surface of the shaft. Said captor devices extend above the shaft so that they are in proximity to but not in direct contact with the at least one magnet/compartment of magnets. The captor devices are configured to capture electrical energy generated by the said at least one magnet/compartment of magnets, and to transmit the electrical energy to the outer surface of the shaft. The at least three brushes in contact with the outer surface of the shaft makes and breaks electrical current as the shaft rotates. The inverting apparatus comprises connecting devices made of conductive material, connected to the at least three brushes, said connecting devices configured to transfer electrical energy from the at least three brushes to other sources.

In another aspect, the subject matter is embodied in a method for making and distributing electrical energy so that a portion of the electrical energy could be used for AC sources and another portion could be used for DC sources e.g. to recharge at least one power source/storage device. The said method comprises transferring electrical energy from at least one power source/storage device to a recharging electric generator system; making and breaking electric current; adjusting the voltage of the electrical current; converting a portion of the electrical energy from AC to DC; transferring DC electrical energy to (re)charge at least one DC power source/storage device; transferring AC electrical energy (which was not converted from AC to DC) to power outlets/output terminals or AC devices.

In yet another aspect, the subject matter is embodied in a method for a recharging electric generator system as outlined in the "Detailed Description of the Invention" section and wherein the method for configuring an inverting apparatus comprises the following actions: attaching a motor (e.g. 12-volt electric motor) to a connector, said connector configured to rotate as the motor turns; attaching said motor with the connector to at least two surfaces made of non-conductive material, so that the motor is between the non-conductive surfaces; perforating at least one of the non-conductive surfaces so that the said connector can pass through the perforation; attaching said connector to a rotatable shaft, whereby said connector is attached to the motor on one side, passes through the non-conductive surface, and is attached to the rotatable shaft on the other side. The method comprises configuring said connector to rotate the shaft as the motor turns. The method comprises configuring said shaft into two connected segments, wherein each segment comprises an exterior made out of conductive material (e.g. copper) and a core which can be made of another conductive material (e.g. epoxy paste) or the same material as the exterior. The method comprises, placing the shaft in contact with at least three brushes, wherein said brushes are made of conductive material (e.g. metal) and are fixedly mounted to the non-conductive surface. The method comprises placing said brushes in contact with the outer surface of said shaft, positioning said brushes so that a majority of the brushes can be in contact with only one segment of the shaft at a time; and configuring said brushes to make and break electrical current as the shaft rotates. The method may further include attaching connecting devices to said at least three brushes to distribute electrical current for from said at least three brushes further use.

In yet another aspect, the method for a recharging electric generator system as outlined in the "Detailed Description of the Invention" section and wherein the method for configuring an inverting apparatus may further comprise the following actions: attaching a mounting device to said shaft; attaching at least one magnet or a compartment of magnets to said mounting device, wherein at least one magnet is a permanent magnet; configuring the mounting device so that said at least one magnet/compartment of magnets can rotate independently of the shaft. The method further comprises attaching a plurality of captor devices made of conductive material (e.g. copper coils) to the exterior surface of the shaft so that said captor devices extend above the shaft and are in proximity to but not in contact with the at least one magnet/compartment of magnets; configuring said captor devices to capture electrical energy generated by the said magnet/compartment of magnets and to pass the electrical energy to the outer surface of the shaft.

The proposed invention therefore seeks to provide a system which generates electrical energy and recharges itself. The system can be applied to different sectors and is conducive to conditions in both developed and developing countries.

BRIEF DESCRIPTION OF THE SEVERAL VIEWS OF THE DRAWINGS

These and other features, aspects, and advantages of the present invention will become better understood with reference to the following description, appended claims, and accompanying drawings.

DETAILED DESCRIPTION OF THE INVENTION

Figure 1A:
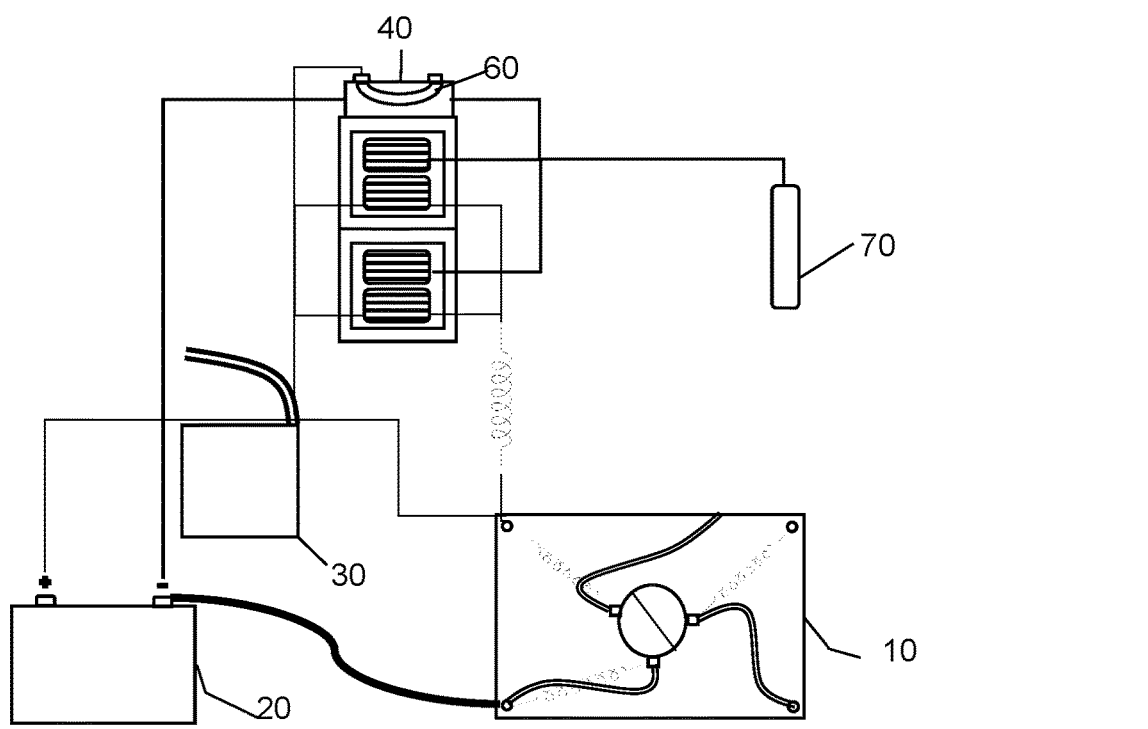
FIGS. 1A-1D show overall configuration diagrams of a recharging electric generator system according to configuration 1-4 of the invention.

Embodiments of the present invention will be described in detail hereinafter with reference to the drawings, in which the same or corresponding portions are denoted with the same reference characters and a description thereof may not be repeated.

FIG. 1A is an overall configuration diagram of a recharging electric generator system according to a first configuration of the invention. Referring to FIG. 1A, a recharging electric generator system 1 comprises at least one inverting apparatus 10 or 10B, at least one power source/storage device 20, a switching device 30, at least one transformer unit 40, and at least one rectifying unit 60 and at least one power outlet/output terminal 70.

In a first configuration of the subject matter, a recharging electric generator system comprises at least one inverting apparatus 10 configured to make and break electrical current. At least one power source/storage device 20 is connected to the at least one inverting apparatus 10. The at least one power source/storage device 20 is configured to provide electrical energy to start the at least one inverting apparatus 10 and to store electrical energy. The recharging electric generator system comprises at least one transformer unit 40 connected to the at least one inverting apparatus 10. Said transformer unit 40 is configured to adjust the voltage of the electrical current received from the at least one inverting apparatus 10 up or down depending on the configuration. The switching device 30 is configured: to start and stop the recharging electric generator system; to control the electrical connections between the at least one power source/storage device 20, the at least one inverting apparatus 10, the at least one transformer unit 40, the at least one rectifying unit 60; and to transfer electrical current to ground. The switching device 30 can also include a sensor/control unit. The at least one transformer unit 40 is connected to at least one rectifying unit 60, said rectifying unit 60 is configured to convert AC to DC. Said rectifying unit 60 is connected to at least one power source/storage device 20 and is configured to transfer electrical energy to charge the power source/storage device 20, thereby providing a sustainable source of energy for the system. The at least one transformer unit 40 could also be configured to transfer electrical energy to at least one power outlet/output terminal 70 without passing through the rectifying unit 60. The at least one power outlet/output terminal 70 can be configured to distribute electrical energy to sources external to the system, e.g. vehicles, appliances, power grids, power storage and other devices.

Figure 2A:
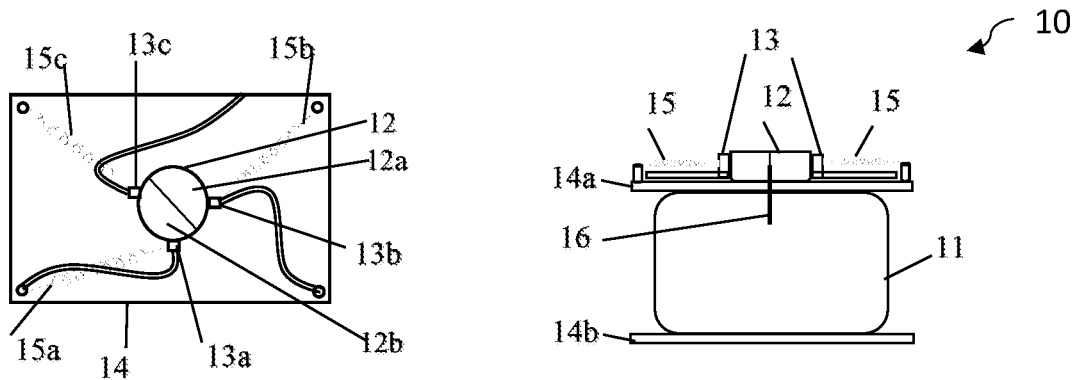
FIGS. 2A-2B show configuration diagrams of an inverting apparatus.

Referring to FIG. 2A, the inverting apparatus 10 comprises a motor 11, a shaft 12, at least three brushes 13a-c, at least two non-conductive surfaces 14a-b, connecting devices 15a-c, and a connector 16 configured to rotate the shaft 12 as the motor 11 turns. The inverting apparatus 10 receives energy from at least one power source/storage device 20 to start the motor 11. When started, the motor 11 rotates the connector 16 which in turn rotates the shaft 12. The shaft 12 has two connected segments 12a-b made of conductive material. The at least three brushes 13a-c are made of conductive material and are fixed to the non-conductive surface 14a of the inverting apparatus 10. The at least three brushes 13a-c are configured so that a majority of the brushes is in contact with only one segment of the shaft 12 at a time. The at least three brushes 13a-c are configured to make and break electrical current as the shaft 12 rotates. Connecting devices 15a-c are attached to the at least three brushes 13a-c, said connecting devices 15a-c are configured to transfer electrical current from the at least three brushes 13a-c for further distribution.

Figure 2B:
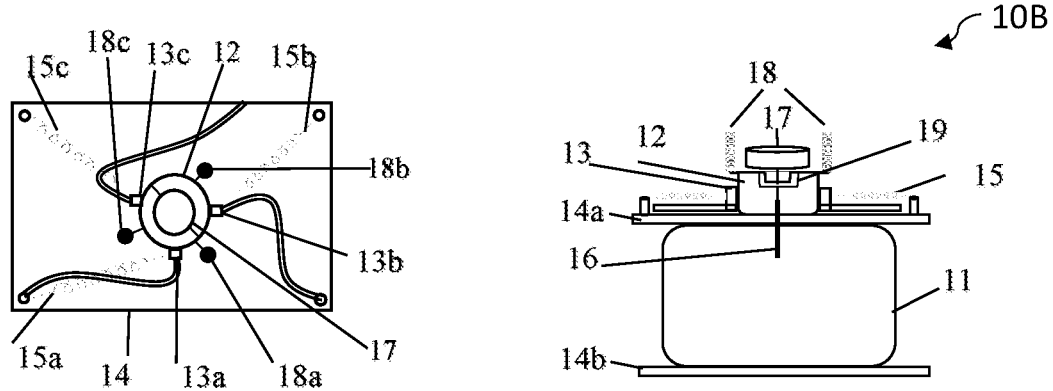

Referring to FIG. 2B, the inverting apparatus 10B configured to generate electrical current comprises a motor 11, a shaft 12, at least three brushes 13a-c, at least two non-conductive surfaces 14a-b, connecting devices 15a-c, a connector 16 configured to rotate the shaft 12 as the motor 11 turns, at least one magnet/compartment of magnets 17 of which at least one magnet is a permanent magnet, a plurality of captor devices 18a-c connected to the outer surface of the shaft 12, and a mounting device 19 configured to enable the at least one magnet/compartment of magnets 17 to rotate independently of the shaft 12. The inverting apparatus 10B receives energy from at least one power source/storage device 20 to start the motor 11. When started, the motor 11 rotates the connector 16 which in turn rotates the shaft 12. The shaft 12 has two connected segments 12a-b made of conductive material. The shaft 12 also has connected to it a mounting device 19. At least one magnet/compartment of magnets 17 is mounted to said mounting device 19 which is configured so that said at least one magnet/compartment of magnets 17 can rotate independently of the shaft 12. A plurality of captor devices 18a-c are attached to the exterior surface of the shaft 12. Said captor devices 18a-c extend above the shaft 12 and are in proximity to but not in contact with the at least one magnet/compartment of magnets 17. The captor devices 18a-c capture electrical energy generated by the said at least one magnet/compartment of magnets 17 and transmit the electrical energy to the outer surface of the shaft 12. The at least three brushes 13a-c are made of conductive material and are fixed to the non-conductive surface 14a of the inverting apparatus 10B. The at least three brushes 13a-c are configured so that a majority of the brushes is in contact with only one segment of the shaft 12 at a time. The at least three brushes 13a-c are configured to make and break electrical current as the shaft 12 rotates. Connecting devices 15a-c are attached to the at least three brushes 13a-c, said connecting devices 15a-c configured to transfer electrical current from the at least three brushes 13a-c for further distribution.

The at least one inverting apparatus 10 or 10B outputs electrical current to at least one transformer unit 40.

Figure 3:
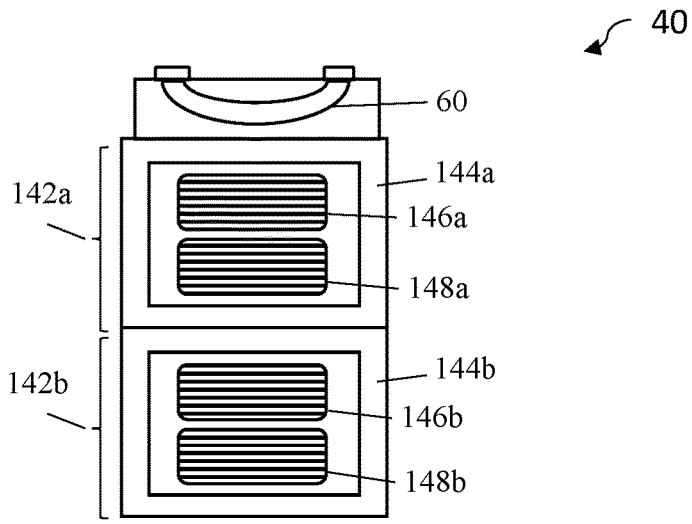
FIG. 3 shows a configuration of a transformer unit with a rectifying unit.

Referring to FIG. 3 the at least one transformer unit 40, comprises one or more cells. In FIG. 3 for example, said transformer unit 40 has two cells 142a-b, however a transformer unit can contain more cells. Each cell 142a-b comprises a core 144a-b made of magnetically chargeable materials (e.g. steal or iron), and a plurality of coils 146a-b and 148a-b made of conductive material (e.g. copper). Within each cell 142a-b, at least one coil (primary coil) 148a-b is configured to receive electrical energy into the cell 142a-b and to pass the electrical energy on to the switching device 30 and to ground. The remaining coils (secondary coils) 146a-b are configured to: collect the electrical energy from the core 144a-b; adjust the voltage of the electrical current; and pass the electrical energy on for further distribution.

Primary coils 148a-b of the at least one transformer unit 40 are connected to the connecting devices 15a-c of the inverting apparatus 10 or 10B at the one end and to the switching device 30 at the other end. As current is received in the cells 142a-b via the primary coils 148a-b, the core 144a-b becomes magnetically charged.

Secondary coils 146a-b of the at least one transformer unit 40: collect the electrical energy from the core 144a-b, adjust the voltage of the electrical current and pass the electrical energy to at least one rectifying unit 60. The secondary coils 146a-b can be configured to step up or down the voltage of the electrical current by increasing or decreasing the number of loops in the coils. The rectifying unit 60 converts AC to DC and transfers electrical energy to recharge at least one power source/storage device 20, to provide a sustainable source of power for the system.

Secondary coils 146*a-b* of at least one transformer unit 40 can also transfer a portion of the electrical energy to at least one power outlet/output terminal 70 without passing through the rectifying unit 60. The power outlets/output terminal 70 could also be configured to transfer electrical energy to external devices via wireless means.

Figure 1B:
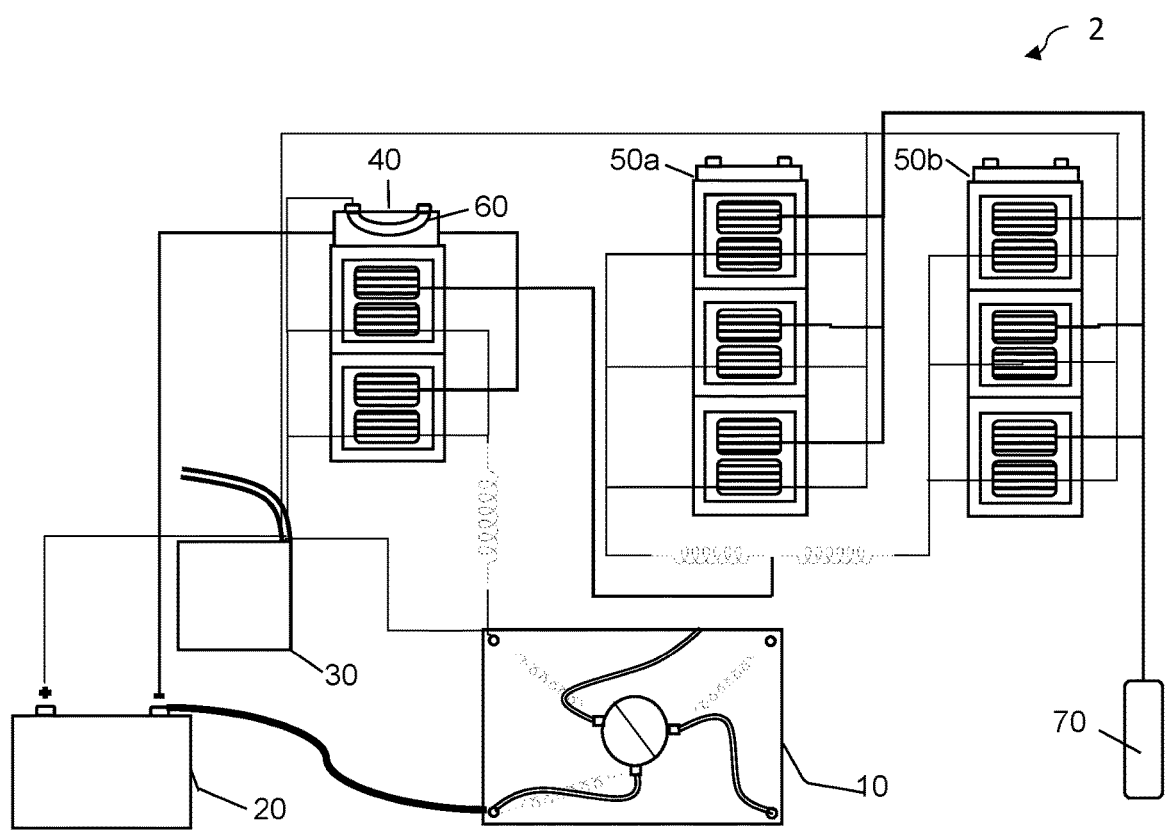

FIG. 1B is an overall configuration diagram of a recharging electric generator system according to a second configuration of the invention. Referring to FIG. 1B, a recharging electric generator system 2 comprises at least one inverting apparatus 10 or 10B, at least one power source/storage device 20, a switching device 30, a primary transformer unit 40, one or more additional transformer units 50*a-b*, at least one rectifying unit 60 and at least one power outlet/output terminal 70.

The second configuration of the subject matter incorporates the elements of the first configuration, but further comprises the following features. The recharging electric generator system further comprises a plurality of transformer units, including a primary transformer unit 40 and one or more additional transformer units 50*a* and 50*b*. The primary transformer unit 40 is connected to one or more additional transformer units 50*a-b* or to a series of individual additional transformer units. The additional transformer units 50*a-b* are configured to adjust the voltage of the electrical current received from the primary transformer unit 40 or from a previous transformer unit in a series. One or more additional transformer units 50*a-b* are connected to at least one power outlet/output terminal 70, said at least one power outlet/output terminal 70 can be configured to distribute electrical energy to external sources, e.g. vehicles, appliances, power grids, power storage and other devices.

Referring to FIG. 1B, in this embodiment, at least one inverting apparatus 10 or 10B outputs electrical current to the primary transformer unit 40.

Referring to FIG. 3 the primary coils 148*a-b* of the primary transformer unit 40 are connected to the connecting devices 15*a-c* of the at least one inverting apparatus 10 or 10B at the one end and to the switching device 30 at the other end. As current is received in the cells 142*a-b* via the primary coils 148*a-b*, the core 144*a-b* becomes magnetically charged.

Secondary coils 146*a-b* of the primary transformer unit 40 collect the electrical energy from the core 144*a-b*, adjust the voltage of the electrical current and pass the electrical energy to additional transformer units 50*a-b*. The secondary coils 146*a-b* can be configured to step up or down the voltage of the electrical current by increasing or decreasing the number of loops in the coils. The secondary coils 146*a-b* of the primary transformer unit 40 also pass a portion of the electrical energy to at least one rectifying unit 60. The rectifying unit 60 converts AC to DC and transfers electrical energy to at least one power source/storage device 20 to recharge the power source/storage device 20 and provide a sustainable source of electrical energy for the system.

Figure 4:
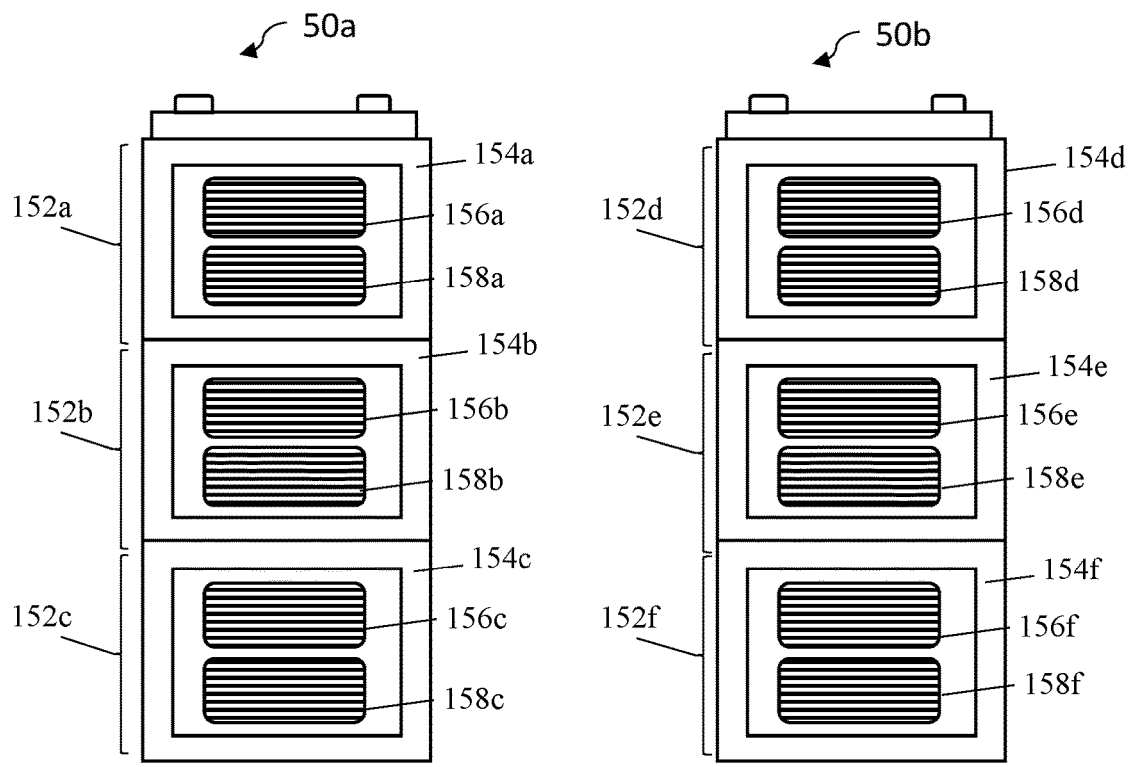
FIG. 4 shows a configuration of additional transformer units.
Figure 5A:
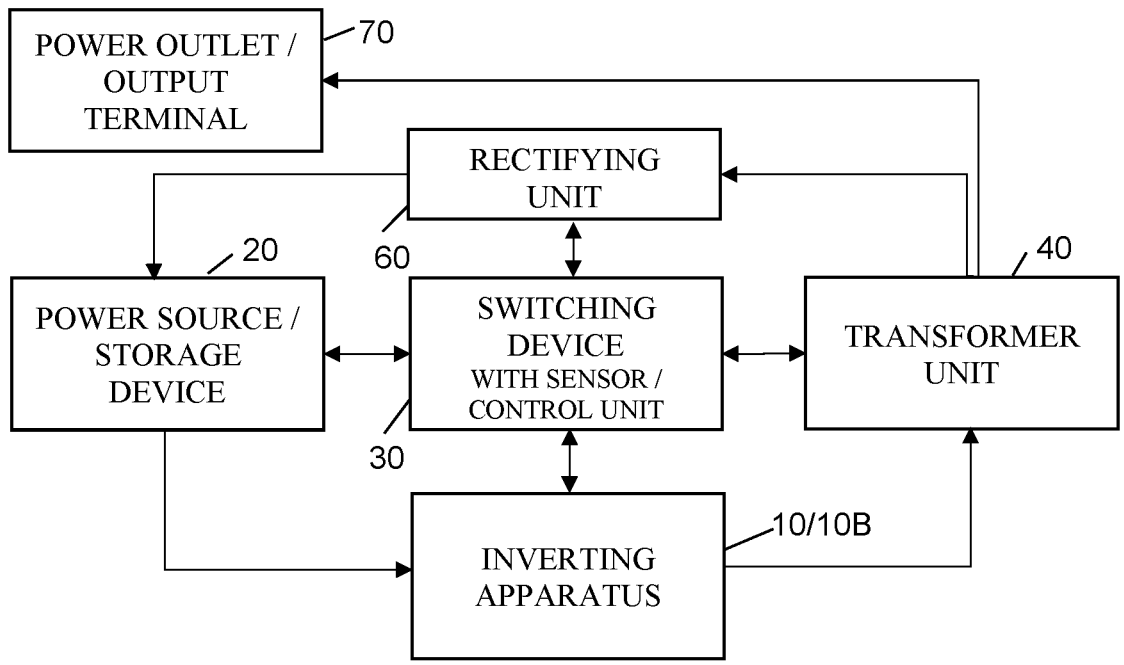
FIGS. 5A-5D show schematic diagrams of a recharging electric generator system according to configuration 1-4 of the invention.
Figure 5B:
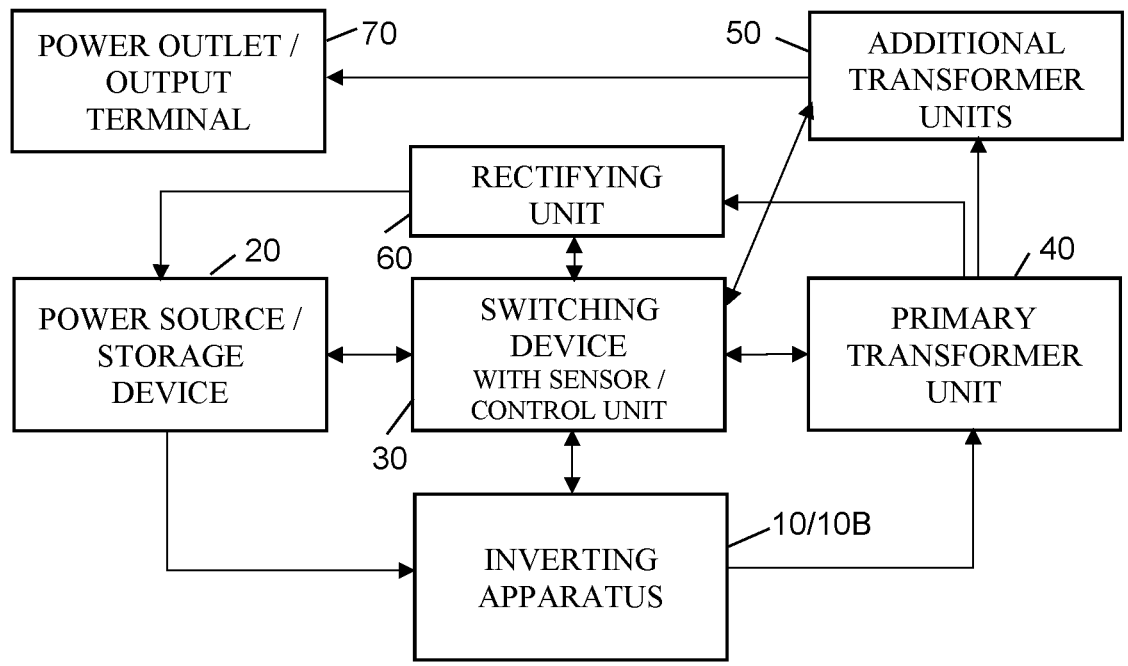
Figure 5C:
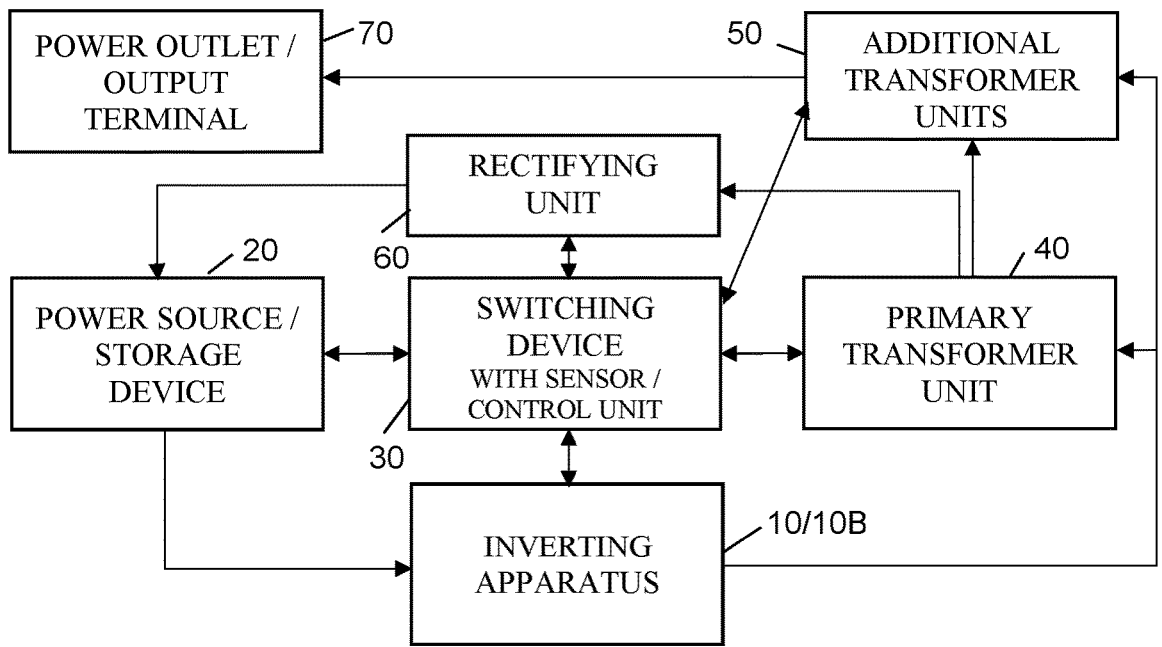
Figure 5D:
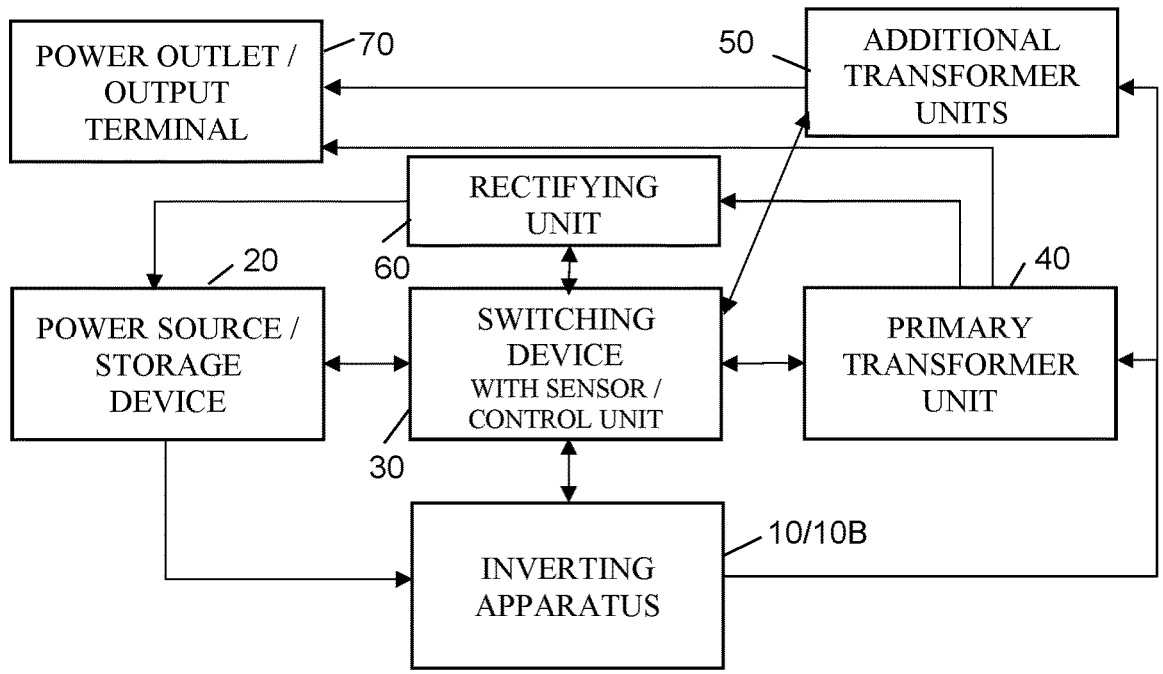

Referring to FIG. 4 the additional transformer units 50*a-b* include one or more cells 152*a-f*. In FIG. 4 for example, additional transformer units 50*a* and 50*b* each have three cells 152*a-c* and 152*d-f*, respectively; however, a transformer unit can have more cells. Each cell 152*a-f* comprises a core 154*a-f* made of magnetically chargeable materials (e.g. steal or iron), and a plurality of coils 156*a-f* and 158*a-f* made of conductive material (e.g. copper wire). Within each cell 152*a-f*, at least one coil (primary coil) 158*a-f* is configured to receive electrical energy into the cell 152*a-f* and to pass the electrical energy on to the switching device 30 and to ground. The remaining coils (secondary coils) 156*a-f* are configured to collect the electrical energy from the core 154*a-f*, adjust the voltage of the electrical current and to pass the electrical energy on for further distribution.

Primary coils 158*a-f* of additional transformer units 50*a-b* are connected to the secondary coils 146*a-b* of the primary transformer unit 40 at the one end and to the switching device 30 at the other end. As current is received in the cells 152*a-f* via the primary coils 158*a-f*, the core 154*a-f* become magnetically charged.

Secondary coils 156*a-f* of additional transformer units 50*a-b* collect the electrical energy from the core 154*a-f*, adjust the voltage of the electrical current and pass the electrical energy on for further distribution, e.g. to additional transformer units within a series of individual transformer units or to at least one power outlet/output terminal 70. The secondary coils 156*a-f* of additional transformer units 50*a-b* could also transmit the electrical energy to at least one rectifying unit 60 which converts AC to DC and transfers electrical energy to recharge at least one power source/storage device 20 if needed (not shown in diagram).

Figure 1C:
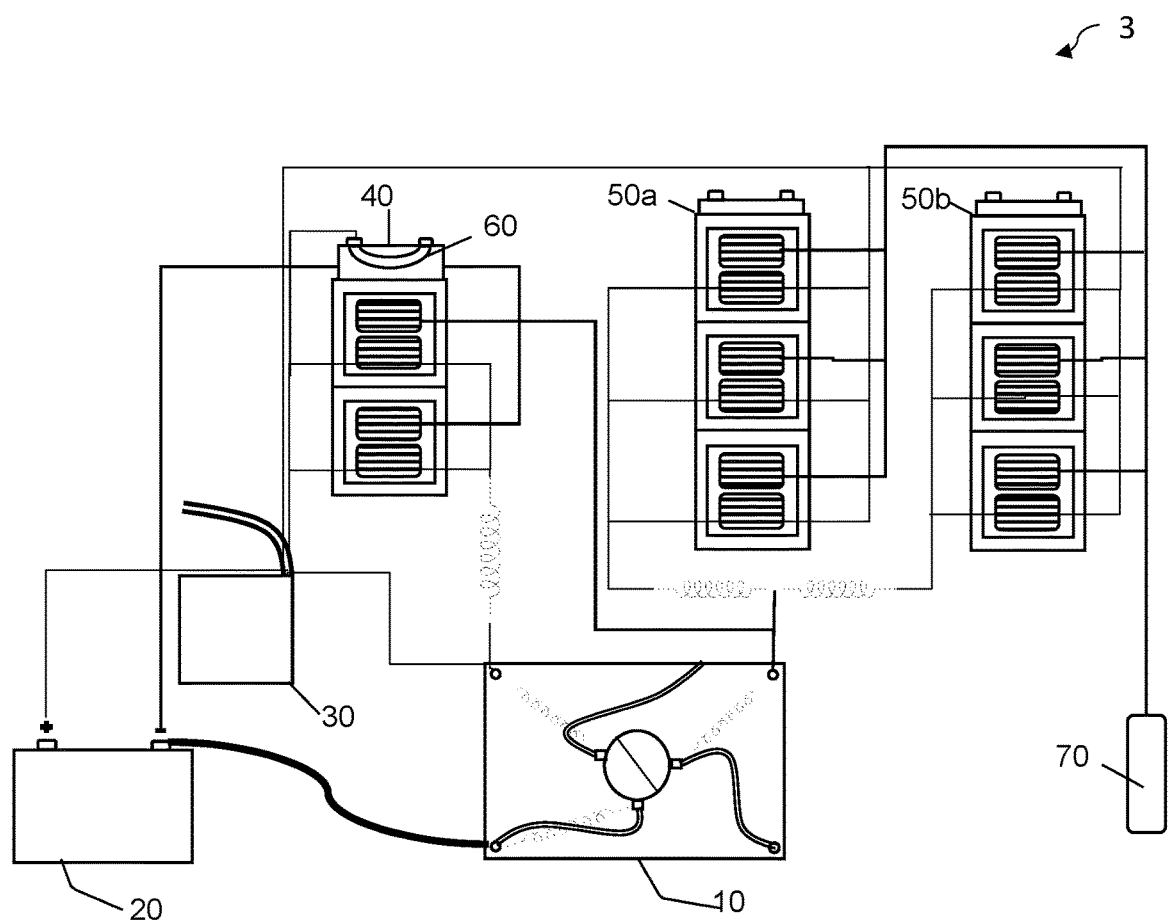

FIG. 1C is an overall configuration diagram of a recharging electric generator system according to a third configuration of the invention. Referring to FIG. 1C, a recharging electric generator system 3 comprises at least one inverting apparatus 10 or 10B, at least one power source/storage device 20, a switching device 30, a primary transformer unit 40, one or more additional transformer units 50*a-b*, at least one rectifying unit 60 and at least one power outlet/output terminal 70.

The third configuration of the subject matter incorporates the elements of the second embodiment and further comprises the following features. The at least one inverting apparatus 10 or 10B is connected to a plurality of transformer units, including a primary transformer unit 40 and additional transformer units 50*a* and 50*b*. Each of said transformer units is configured to adjust the voltage of the electrical current received from at least one inverting apparatus 10 or 10B. The primary transformer unit 40 is connected to one or more additional transformer units 50*a* and 50*b* or to a series of individual additional transformer units. The additional transformer units 50*a-b* are configured to adjust the voltage of electrical current received from a previous transformer unit and from the at least one inverting apparatus 10 or 10B.

Referring to FIG. 1C, in this configuration, at least one inverting apparatus 10 or 10B outputs electrical current to transformer units 40, 50*a* and 50*b*.

Referring to FIG. 3, primary coils 148*a-b* of the primary transformer unit 40 are connected to the connecting devices 15*a-c* of the at least one inverting apparatus 10 or 10B at the one end and to the switching device 30 at the other end. As current is received in the cells 142*a-b* via the primary coils 148*a-b*, the core 144*a-b* becomes magnetically charged.

Secondary coils 146*a-b* of the primary transformer unit 40 collect the electrical energy from the core 144*a-b*, adjust the voltage of the electrical current and pass the electrical energy to additional transformer units 50*a-b*. The secondary coils 146*a-b* can be configured to step up or down the voltage of the electrical current by increasing or decreasing the number of loops in the coils. The secondary coils 146*a-b* of transformer unit 40 also pass a portion of the electrical energy to at least one rectifying unit 60. The rectifying unit 60 converts AC to DC and transfers electrical energy to at least one power source/storage device 20 to recharge the at least one power source/storage device 20 and provide a sustainable source of power for the system.

Referring to FIG. 4, primary coils 158a-f of additional transformer units 50a-b are connected to at least one inverting apparatus 10 or 10B and to the secondary coils 146a-b of the primary transformer unit 40 at the one end and to the switching device 30 at the other end. As current is received in the cells 152a-f via the primary coils 158a-f, the core 154a-f become magnetically charged.

Secondary coils 156a-f of additional transformer units 50a-b collect the electrical energy from the core 154a-f, adjust the voltage of the electrical current and pass the electrical energy on for further distribution, e.g. to additional transformer units within a series of individual transformer units or to at least one power outlet/output terminal 70. The secondary coils 156a-f of additional transformer units 50a-b could also transmit the electrical energy to at least one rectifying unit 60 which converts AC to DC and transfers electrical energy to recharge at least one power source/storage device 20 if needed (not shown in diagram).

Figure 1D:
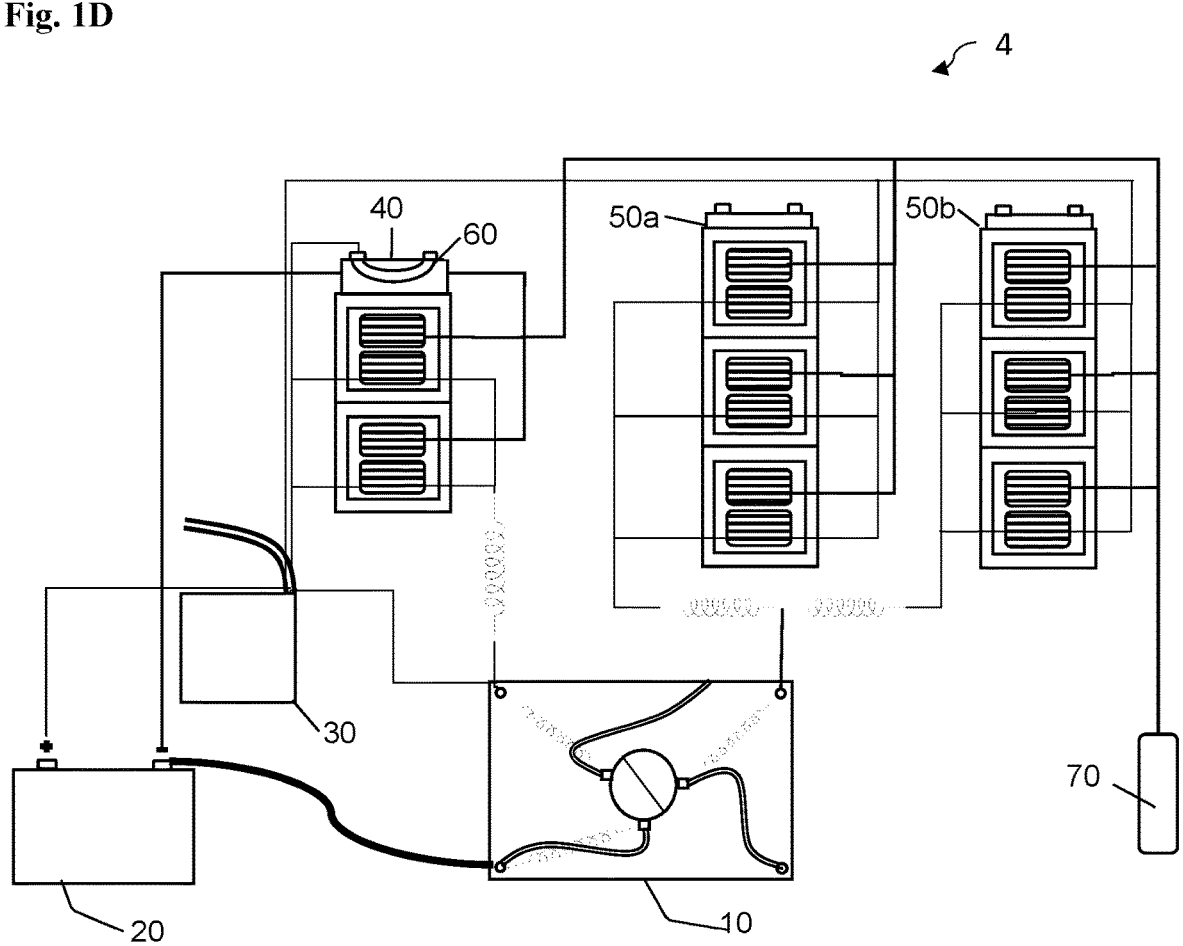

FIG. 1D is an overall configuration diagram of a recharging electric generator system according to a fourth configuration of the invention. Referring to FIG. 1D, a recharging electric generator system 4 comprises at least one inverting apparatus 10 or 10B, at least one power source/storage device 20, a switching device 30, a primary transformer unit 40, one or more additional transformer units 50a-b, at least one rectifying unit 60 and at least one power outlet/output terminal 70.

The fourth configuration incorporates the elements of the first configuration and further comprises the following features. The recharging electric generator system further comprises a plurality of transformer units, including a primary transformer unit 40 and additional transformer units 50a and 50b. The additional transformer units 50a-b are configured to adjust the voltage of the electrical current received from at least one inverting apparatus 10 or 10B. The additional transformer units 50a-b are connected to at least one power outlet/output terminal 70, the said power outlets/output terminals 70 can be configured to distribute electrical energy to external sources, e.g. vehicles, appliances, power grids, power storage and other devices.

Referring to FIG. 1D, in this configuration, at least one inverting apparatus 10 or 10B outputs electrical energy to transformer units 40, 50a and 50b.

Referring to FIG. 3 the primary coils 148a-b of the primary transformer unit 40 are connected to the connecting devices 15a-c of the at least one inverting apparatus 10 or 10B at the one end and to the switching device 30 at the other end. As current is received in the cells 142a-b via the primary coils 148a-b, the core 144a-b becomes magnetically charged.

Secondary coils 146a-b of the primary transformer unit 40 collect the electrical energy from the core 144a-b, adjust the voltage of the electrical current and pass the electrical energy to at least one rectifying unit 60. The secondary coils 146a-b can be configured to step up or down the voltage of the electrical current by increasing or decreasing the number of loops in the coils. The rectifying unit 60 converts AC to DC and transfers electrical energy to recharge at least one power source/storage device 20, to provide a sustainable, cost-effective source of power for the system.

Referring to FIG. 4 the additional transformer units 50a-b, include one or more cells 152a-f. In FIG. 4 for example, additional transformer units 50a and 50b each have three cells 152a-c and 152d-f, respectively; however, a transformer unit can have more cells. Each cell 152a-f comprises a core 154a-f made of magnetically chargeable materials (e.g. steal or iron), and a plurality of coils 156a-f and 158a-f made of conductive material (e.g. copper). Within each cell 152a-f, at least one coil (primary coil) 158a-f is configured to receive electrical energy into the cell 152a-f and to pass the electrical energy on to the switching device 30 and to ground. The remaining coils (secondary coils) 156a-f are configured to collect the electrical energy from the core 154a-f, adjust the voltage of the electrical current and to pass the electrical energy on for further distribution.

Primary coils 158a-f of additional transformer units 50a-b are connected to the connecting devices 15a-c of the at least one inverting apparatus 10 or 10B at the one end and to the switching device 30 at the other end. As current is received in the cells 152a-f via the primary coils 158a-f, the core 154a-f become magnetically charged.

Secondary coils 156a-f of additional transformer units 50a-b collect the electrical energy from the core 154a-f, adjust the voltage of the electrical current and pass the electrical energy on for further distribution, e.g. to additional transformer units within a series of individual transformer units or to at least one power outlet/output terminal 70. The secondary coils 156a-f of additional transformer units 50a-b could also transmit the electrical energy to at least one rectifying unit 60 which converts AC to DC and transfers electrical energy to recharge at least one power source/storage device 20 if needed (not shown in diagram).

FIGS. 5A-5D provide schematic diagrams of different configuration of a recharging electric generator system as discussed with reference to FIGS. 1A-1D above and therefore will not be described in detail here.

Figure 6:
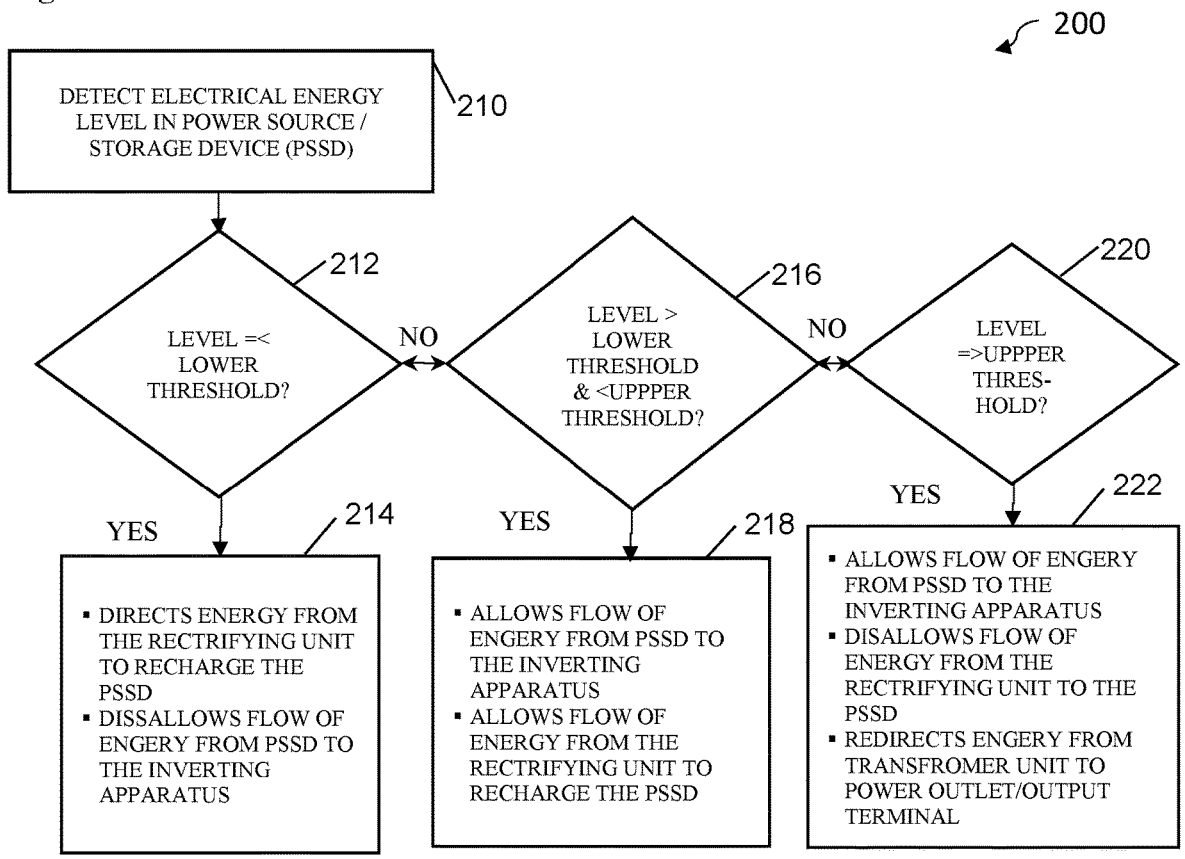
FIG. 6 is a flowchart showing actions that may be executed by a switching device with a sensor/control unit to monitor and regulate the state of charge of at least one power source/storage device.

FIG. 6 provides a flowchart of an example process 200 for monitoring the level of energy charge within at least one power source/storage device 20 and for regulating the amount of electrical energy transferred from at least one transformer unit 40 via at least one rectifying unit 60 to at least one power source/storage device 20. A switching device comprising a sensor/control unit 30 may be configured to implement process 200. Said switching device with a sensor/control unit 30 detects the level of electrical energy within said at least one power source/storage device 20 (210). If the energy level of that at least one power source/storage device 20 is at or below a lower threshold (e.g. 10% of its charge capacity) (212), the switching device with a sensor/control unit 30 conducts the following actions (214): directs electrical energy from at least one transformer unit 40 via at least one rectifying unit 60 to the power source/storage device 20 to recharge the power source/storage device 20; and disconnects the flow of energy from the power source/storage device 20 to the at least one inverting apparatus 10 or 10B. If the energy level of a power source/storage 20 device is between the lower (e.g. 10%) and upper thresholds (e.g. 90%) (216), the switching device with a sensor/control unit 30 conducts the following actions (218): allows the flow of energy from the power source/storage device 20 to the at least one inverting apparatus 10 or 10B and allows the flow of electrical energy from the at least one transformer unit 40 via the at least one rectifying unit 60 to the power source/storage device 20 to recharge the power source/storage device 20. If the energy level of a power source/storage device is at or above an upper threshold (e.g. 90%) (220), the switching device with a sensor/control unit 30 conducts the following actions (222): disallows the flow of electrical energy from the at least one transformer unit 40 via at least one rectifying unit 60 to the power source/storage device 20; redirects electrical energy from the at least one transformer unit 40 to at least one power outlet/output terminal 70; allows the flow of energy from the power source/storage device 20 to the at least one inverting apparatus 10 or 10B.

Figure 7:
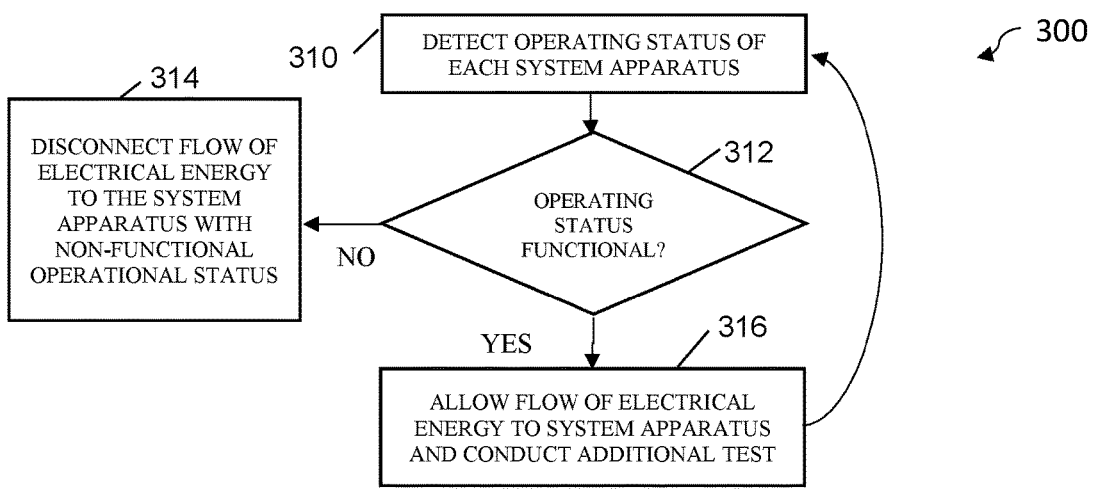
FIG. 7 is a flowchart showing actions that may be executed by a switching device with a sensor/control unit to monitor the operational status of the system apparatus.

FIG. 7 provides a flowchart of an example process 300 for monitoring the operational status of the system apparatus. A switching device with a sensor/control unit 30 may be configured to implement process 300. Said switching device with a sensor/control unit 30, is connected to the at least one power source/storage device 20, to the at least one inverting apparatus 10 or 10B, to the one or more transformer units 40 and 50, and to the at least one rectifying unit 60, hereafter jointly referred to as the system apparatus. The switching device with a sensor/control unit 30 detects the operating status of each system apparatus (310). If the operational status is functional (312), the switching device with a sensor/control unit 30 allows the flow of electrical energy to the system apparatus and conducts additional tests (316). If the operational status is not functional (312), the switching device with a sensor/control unit 30 disallows the flow of electrical energy to the system apparatus with a non-functional operational status (314). Said switching device with a sensor/control unit 30 could also be configured to send an error message when the operational status of a system apparatus is detected as non-functional.

Although the present invention has been described in considerable detail with reference to certain preferred versions thereof, other versions are possible. Therefore, the spirit and scope of the appended claims should not be limited to the description of the preferred versions contained therein. Any element in a claim that does not explicitly state "means for" performing a specified function, or "step for" performing a specified function, is not to be interpreted as a "means" or "step" clause as specified in 35 U.S.C. § 112, ¶6. In particular, the use of "step of" in the claims is not intended to invoke the provisions of 35 U.S.C. § 112, ¶6.

What is claimed is:

1. A recharging electric generator system, comprising:
   at least one inverting apparatus configured to make and break electrical current, said inverting apparatus comprising:
   at least one motor and
   at least two non-conductive surfaces attached to the motor, wherein the motor is situated between the two non-conductive surfaces and wherein at least one non-conductive surface is perforated;
   at least one connector connected at one end to the motor, wherein the connector is: configured to rotate as the motor turns; and configured to pass through the perforation of the non-conductive surface;
   at least one shaft connected to the connector, wherein said shaft comprises two connected segments made of conductive material;
   at least three brushes made of conductive material attached to the non-conductive surface, wherein said brushes are: positioned in contact with the shaft;
   positioned so that a majority of the brushes are in contact with only one segment of the shaft at a time; and configured to make and break electrical current as the shaft rotates; and
   connecting devices connected to the at least three brushes, said connecting devices made of conductive material and configured to distribute electrical energy from the at least three brushes;
   at least one power source/storage device connected to the inverting apparatus, wherein said power source/storage device is configured to provide power to start the inverting apparatus and to store energy;
   at least one transformer unit connected to the inverting apparatus, said transformer unit configured to adjust the voltage of electrical current received from the inverting apparatus, up or down depending on the configuration of the transformer unit;
   at least one rectifying unit connected to the transformer unit and to the power source/storage device, said rectifying unit configured to convert alternating current (AC) to direct current (DC) and to transfer electrical energy from the transformer unit to the power source/storage device to recharge the power source/storage device;
   a switching device connected to the power source/storage device, the inverting apparatus, the transformer unit and to the rectifying unit; said switching device configured: to start and stop the recharging electric generator system; to control the electrical connections between the power source/storage device, the inverting apparatus, the transformer unit and the rectifying unit; and to transfer electrical current to ground; and
   at least one power outlet/output terminal connected to the transformer unit, said power outlet/output terminal configured to distribute electrical energy to external sources.

2. The recharging electric generator system of claim 1, wherein said inverting apparatus further comprising:
   a mounting device attached to the shaft;
   at least one magnet or compartment of magnets attached to the mounting device, wherein said mounting device is configured so that the magnet/compartment of magnets can rotate independently of the shaft; and wherein said a magnet or compartment of magnets comprises at least one permanent magnet; and
   a plurality of captor devices made of conductive material connected to the outer surface of the shaft wherein said captor devices: extend above the shaft in proximity to but not in direct contact with the magnet/compartment of magnets in order to capture electrical energy generated by the magnet or compartment of magnets and transmit electrical energy to the outer surface of the shaft.

3. The recharging electric generator system of claim 2, wherein:
   said switching device further comprising a sensor/control unit, configured to detect the amount of electrical energy stored in the power source/storage device;
   and configured to control the amount of electrical energy transferred to the power source/storage device to avoid overcharging the power source/storage device, wherein:
   when the energy level of the power source/storage device is at or below a lower threshold, the switching device comprising a sensor/control unit directs electrical energy from the transformer unit via the rectifying unit to the power source/storage device to recharge the power source/storage device; and disconnects the flow of energy from the power source/storage device to the inverting apparatus;
   when the energy level of the power source/storage device is at or above an upper threshold, the switching device comprising a sensor/control unit prevents the flow of electrical energy from the transformer unit via the rectifying unit to the power source/storage device; redirects electrical energy from the transformer unit to the power outlet/output terminal; and allows the flow of energy from the power source/storage device to the inverting apparatus; and
   when the energy level of the power source/storage device is between the upper and lower thresholds, the switching device comprising a sensor/control unit allows the transfer of electrical energy to and from the power source/storage device;

said switching device comprising a sensor/control unit further configured to detect the operating status of the power source/storage device, the inverting apparatus, the transformer unit and the rectifying unit, wherein:

when the operational status of a power source/storage device, inverting apparatus, transformer unit or rectifying unit is functional, the switching device allows the flow of electrical energy to the power source/storage device, the inverting apparatus, the transformer unit and the rectifying unit and conducts additional tests;

when the operational status is not functional, the switching device disconnects the flow of electrical energy to the power source/storage device, inverting apparatus, transformer unit or rectifying unit; and the sensor/control unit further configured to send an error message when the operational status of a system apparatus is detected as non-functional.

4. The recharging electric generator system of claim 3, further comprising a plurality of transformer units, including at least one primary transformer unit, and one or more additional transformer units, wherein:

the primary transformer unit connected to the inverting apparatus, said primary transformer unit configured to adjust the voltage of the electrical current received from the inverting apparatus; said primary transformer unit also connected to the rectifying unit, said rectifying unit configured to convert alternating current (AC) to direct current (DC); said rectifying unit also connected to the power source/storage device, said rectifying unit configured to transfer electrical energy from the transformer unit to the power source/storage device to recharge the power source/storage device;

the primary transformer unit also connected to one or more additional transformer units or to a series of individual additional transformer units, the one or more additional transformer units configured to adjust the voltage of the electrical current received from the primary transformer unit or from a previous transformer unit within a series of individual additional transformer units; and the one or more additional transformer units connected to the power outlet/output terminal, said power outlet/output terminal configured to distribute electrical energy.

5. The recharging electric generator system of claim 4, wherein:

the one or more additional transformer units connected to the inverting apparatus and connected to the primary transformer unit; and the one or more additional transformer units configured to adjust the voltage of electrical current received from the inverting apparatus wherein said transformer units configured to adjust the voltage of the electrical current received from the at least one inverting apparatus.

6. The recharging electric generator system of claim 3, further comprising a plurality of transformer units, including at least one primary transformer unit, and one or more additional transformer units, wherein:

the primary transformer unit and the one or more additional transformer units connected to the inverting apparatus, the plurality of transformer units configured to adjust the voltage of the electrical current received from the inverting apparatus;

the primary transformer unit connected to the rectifying unit, said rectifying unit configured to convert alternating current (AC) to direct current (DC); said rectifying unit connected to the power source/storage device, said rectifying unit configured to transfer electrical energy from the transformer unit to the power source/storage device to recharge the power source/storage device; and the primary transformer unit and the one or more additional transformer units connected to the power outlet/output terminal, said power outlet/output terminal configured to distribute electrical energy.

7. A method for a recharging electric generator system, comprising:

connecting at least one power source/storage device, at least one inverting apparatus, at least one transformer unit, and at least one rectifying unit with a switching device comprising a sensor/control unit;

configuring said inverting apparatus to comprise at least one motor, at least one a shaft, at least three brushes, at least two non-conductive surfaces, a plurality of connecting devices, and at least one connector, by:

attaching the motor to the connector, said connector configured to rotate as the motor turns;

attaching the motor with the connector to at least two surfaces made of non-conductive material, so that the motor situated between the two non-conductive surfaces;

perforating at least one of the non-conductive surfaces so that the connector passes through;

attaching the connector to a rotatable shaft, whereby the connector is attached to the motor on one side, and to the rotatable shaft on the other side;

configuring the connector to rotate the shaft as the motor turns;

configuring the shaft into two connected segments, wherein each segment comprises an exterior made out of conductive material and a core made of another conductive material or the same material as the exterior;

placing the shaft in contact with a plurality of brushes, wherein said brushes: made of conductive material; mounted to the non-conductive surface; placed in contact with the outer surface of the shaft; configured so that a majority of the brushes in contact with only one segment of the shaft at a time; and configured to make and break electrical current as the shaft rotates;

connecting the motor of the inverting apparatus to a power source/storage device, said power source/storage device configured to provide electrical energy to start the motor;

configuring the transformer unit to comprise: one or more cells wherein the cell walls made of magnetically chargeable material; and a plurality of primary and secondary coils made of conductive material located within the one or more cells;

further configuring the transformer unit by:

connecting the primary coils to the connecting devices of the inverting apparatus at one end and to the switch device at the other end, so that electrical energy passes through the cell via the primary coils to magnetically charge the cells;

configuring the secondary coils to capture electrical current from the cell and to adjust the voltage up or down by increasing or decreasing the number of loops in the coils;

connecting the secondary coils of the transformer unit to at least one power outlets/output terminal to distribute the electrical energy;

further connecting the secondary coils of the transformer unit to the rectifying unit, said rectifying unit configured to convert alternating current (AC) to direct current (DC);

connecting the rectifying unit to the power source/storage device, and configuring the rectifying unit to transfer electrical energy from the transformer unit to the power source/storage device to recharge the power source/storage device;

configuring the switching device comprising a sensor/control unit to: monitor the amount of electrical energy stored in the power source/storage device and to regulate the amount of electrical energy transferred from the transformer unit via the rectifying unit to the power source/storage device to avoid overcharging the power source/storage device, wherein:

when the energy level of the power source/storage device is at or below a lower threshold, the switching device: directs electrical energy from the transformer unit via the rectifying unit to the power source/storage device to recharge the power source/storage device; and disconnects the flow of energy from the power source/storage device to the inverting apparatus;

when the energy level of the power source/storage device is at or above an upper threshold, the switching device: prevents the flow of electrical energy from the transformer unit via the rectifying unit to the power source/storage device; redirects electrical energy from the transformer unit to the power outlet/output terminal; and allows the flow of energy from the power source/storage device to the inverting apparatus;

further configuring said switching device comprising a sensor/control unit to conduct tests of the operational status of the power source/storage device, the inverting apparatus, the transformer unit and the rectifying unit, wherein: when the operational status is functional, the switching device allows the flow of electrical energy to the power source/storage device, the inverting apparatus, the transformer unit and the rectifying unit and conducts additional tests; and when the operational status is not functional, the switching device disconnects the flow of electrical energy;

further configuring said switching device comprising a sensor/control unit to send an error message when the operational status of a system apparatus is detected as non-functional.

8. The method for a recharging electric generator system as per claim 7 further comprising:

configuring the inverter apparatus to further comprise: a mounting device, at least one magnet or compartment of magnets, and a plurality of capture devices, by:

connecting the mounting device to the shaft;

connecting the magnet or compartment of magnets to said mounting device, wherein at least one of the magnets is a permanent magnet;

configuring the mounting device so that the magnet/compartment of magnets can rotate independently of the shaft; and connecting a plurality of captor devices made of conductive material to the exterior surface of the shaft so that the captor devices: extend above the shaft in proximity to but not in contact with the at least one magnet/compartment of magnets;

capture electrical energy generated by the magnet/compartment of magnets; and pass the electrical energy to the outer surface of the shaft.

* * * * *